United States Patent
Amiel et al.

(10) Patent No.: US 8,219,148 B2
(45) Date of Patent: Jul. 10, 2012

(54) METHOD FOR ACTIVATING THE SUBSCRIPTION OF AN UICC DEVICE

(75) Inventors: Patrice Amiel, Les Milles (FR); Xavier Berard, Cadolive (FR); Hervé Ganem, Villejuif (FR); Lionel Merrien, Montreal (CA)

(73) Assignee: Gemalto SA, Meudon (FR)

( * ) Notice: Subject to any disclaimer, the term of this patent is extended or adjusted under 35 U.S.C. 154(b) by 87 days.

(21) Appl. No.: 12/754,823

(22) Filed: Apr. 6, 2010

(65) Prior Publication Data

US 2011/0092253 A1  Apr. 21, 2011

Related U.S. Application Data

(60) Provisional application No. 61/167,137, filed on Apr. 6, 2009.

(51) Int. Cl.
*H04B 1/38* (2006.01)

(52) U.S. Cl. ........ 455/558; 455/557; 455/418; 455/419; 455/435.1

(58) Field of Classification Search .......... 455/418, 455/419, 435.1, 557, 558
See application file for complete search history.

(56) References Cited

U.S. PATENT DOCUMENTS

| | | | |
|---|---|---|---|
| 2004/0137890 A1* | 7/2004 | Kalke | 455/418 |
| 2008/0057957 A1* | 3/2008 | Altbaum et al. | 455/435.1 |
| 2009/0239503 A1* | 9/2009 | Smeets | 455/411 |

* cited by examiner

*Primary Examiner* — Ajit Patel
(74) *Attorney, Agent, or Firm* — Pehr B. Jansson; The Jansson Firm

(57) ABSTRACT

The invention provides a method for activating the subscription of an UICC, said UICC comprising an activation application, said method comprising the step of activating the subscription of the holder of the UICC by sending a message to an activation server, said message being sent by the activation application to the activation server by using an IP based communication.

21 Claims, 1 Drawing Sheet

METHOD FOR ACTIVATING THE SUBSCRIPTION OF AN UICC DEVICE

FIELD OF THE INVENTION

The invention concerns activation of a subscription on mobile network such as a long term evolution (LTE)/"fourth generation" (4G) mobile networks.

The invention especially deals with the OTA activation of a subscription thanks to a universal integrated circuit (UICC) application, which is an application performed in the UICC. The UICC is a smart card used for example in handsets such as mobile terminals. The invention also deals with the subsequent update of parametric information stored in the UICC. Thanks to this activation, LTE or 4G network are made operational, enabling for example voice over IP service, SMS service, etc.

BACKGROUND OF THE INVENTION

New wireless communication subscribers can register and activate their subscription, using their cellular phones in several ways.

One manner of activating a subscription is by activating a UICC such as a subscriber identification module (SIM) based mobile device in a wireless network. This activation consists in pre-programming the UICC with the mobile device with temporary activation identifiers, such as international mobile station identity (IMSI) and/or a mobile identification number (MIN), and a temporary electronic serial number which is used to identify the mobile device during registration and activation. The network identifies the temporary electronic serial number associated with the SIM vendor and invokes an over-the-air activation procedure for the SIM UICC mobile device. Once the activation process is completed, the temporary activation identifiers are overwritten.

Such activations, usually encountered on registration/activation processes are typically comprised in "second generation" (2G) or "third generation" (3G) of wireless services. Such activations typically rely on short message service (SMS) or push services, such as session initialisation protocol (SIP).

LTE/4G mobile networks may comprise two layers: an IP packed-switched layer, on top of which is deployed an IP multimedia service (IMS) layer.

The IP packet-switched layer natively provides a TCP/IP connectivity between elements of the network. In particular, it natively enables TCP/IP communication between a UICC and a server.

IMS provides a set of services as for example the voice over IP service, on top of the former IP packet-switched layer.

The IP Multimedia Subsystem (IMS) is a standardised networking architecture for the third generation and further generation mobile networks, which provides the users with mobile and fixed multimedia services. The IMS runs over the standard Internet Protocol (IP), using a Voice-over-IP (VoIP) implementation based on a 3GPP standardised implementation of Session Initiation Protocol (SIP). SIP, in turn, is a protocol developed for initiating, modifying, and terminating an interactive user session that involves multimedia elements such as video, voice, instant messaging, online games, and virtual reality.

This IMS set of services is the one that should be configured in order for the LTE subscription to be activated. However, with this method, a user still needs a push technology such as SIP or SMS for the OTA activation, and still needs to go in a point of sale (PoS) to activate the SIM card.

SUMMARY OF THE INVENTION

It is an object of the invention to provide a method for activating the subscription of an UICC, said UICC comprising an activation application, said method comprising the step of activating the subscription of the holder of the UICC by sending a message to an activation server, said message being sent by the activation application to the activation server by using an IP based communication.

According to one aspect of the invention, the activation application may be an activation applet.

According to other aspects of the invention:
the method may comprise a step of checking an internal activation status;
the method may comprise a step of opening a IP based communication to a pre-defined server or an activation server, that belongs to the Mobile Network Operator (MNO) if the activation status is "Not Activated";
the method may comprise a step of receiving back from the activation server, the necessary subscription and technical information for the subscription;
the method may comprise a step of using another communication channel for the receiving of the necessary subscription and technical information for the subscription;
the method may comprise a step of updating the activation status from "Not Activated" to "Under Activation" if the step of receiving back the necessary subscription and technical information for the subscription from the activation server is successfully executed;
the method may comprise a step of executing activation commands;
the method may comprise a step of updating the activation status to a status "Activated", when the step of executing activation is successfully executed;
the method may comprise the step of receiving an over-the-air message from the activating server for updating files of said UICC;
the IP based communication may be provided by a long time evolution network;
the method may comprise a step of retrying said IP based communication until complete activation process is over.

Another object of the invention is to provide an UICC device which may comprise an activation application, where said method.

Another object of the invention is to provide a handset which may comprise such a UICC device.

Such activation is performed over-the-air. This OTA activation relies only on the IP packet-switched capability.

Thanks to the detection of the first insertion of the UICC in a handset, the activation process is launched immediately after the insertion into a LTE-compatible device.

The invention is now described, by way of example, with reference to the accompanying drawings. The specific nature of the following description should not be construed as limiting in any way the broad nature of this summary.

BRIEF DESCRIPTION OF THE DRAWINGS

In order that the manner in which the above recited and other advantages and features of the invention are obtained, a more particular description of the invention briefly described above will be rendered by reference.

Notwithstanding any other forms that may fall within the scope of the present invention, preferred forms of the invention will now be described, by way of example only, with reference to the accompanying drawings in which.

DETAILED DESCRIPTION OF THE PREFERRED EMBODIMENTS

The present invention may be understood according to the detailed description provided herein.

The invention deals with a method for activating a subscription carried by a device such as an UICC, over-the-air comprising the step of activating the subscription of the holder of the UICC by sending a message to an OTA system, said message being sent to an OTA system by using an IP based communication.

The IP based communication is provided by a long time evolution (LTE) network.

Figure 1:
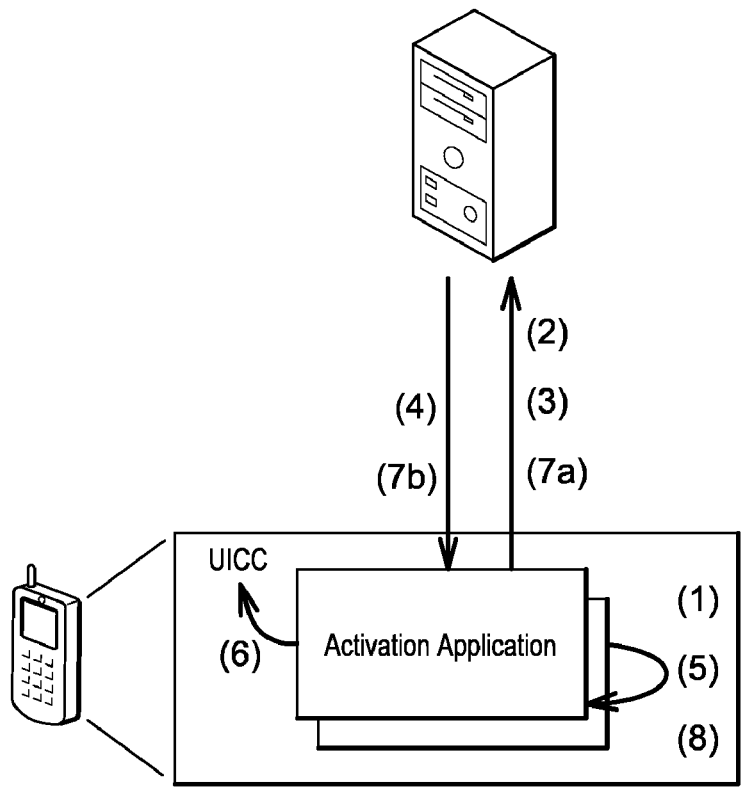
FIG. 1 schematically shows an embodiment of a method according to the invention in a nominal use case.

For doing so, an application such as an applet is deployed at manufacturing time in the UICC. In accordance with the preferred embodiment is as illustrated in FIG. 1, the applet comprises an internal activation status, which is by default set to "0", or "Not Activated" at manufacturing time. The activation status is then "Not Activated" at the very first insertion of the UICC in a handset or a LTE-enabled device and when the subscription in not activated.

The activation status can be set to "1" or "Activated" when the subscription is activated. The applet may comprise another activation status "Under Activation".

This applet, also called the activation applet, is responsible for managing the IMS activation process that mainly consists in updating UICC files (called EF—Electronic File).

The activation applet process comprises the following steps:

in step 1: checking the activation status.

in step 2: if the activation status is "Not Activated", opening a IP-based communication to a pre-defined server or an activation server, that belongs to the Mobile Network Operator (MNO). This is possible because the IP packet-switched layer is natively available for the UICC, even at the very first insertion of the UICC in the LTE device. Connectivity information and server addresses may be stored in the UICC at UICC manufacturing time.

in step 3: sending a "hello" message to the activation server and waiting for a response. The Applicative protocol on top of the IP based communication may be—but is not restricted to—HTTP over TCP; thus the activation applet is able to send a message such as a "hello" message to the activation server. The "hello" message comprises a unique identifier of the UICC that will be used to identify the subscription to be activated. It also may comprise information provided by the UICC in order to enable future asynchronous connection initiated by the activation server.

in step 4: receiving back from the activation server, the necessary subscription and technical information for the configuration of the IMS layer and its related services to be stored in the UICC. When receiving this "hello" message, the activation server is able to send back in to the UICC, information such as the IP Multimedia Private Identity (IMPI), the IP Multimedia Public Identity (IMPU), the Mobile Subscriber ISDN Number (MSISDN), or other information needed by the UICC, through the communication channel used for the "hello" message. Those subscription parameters can be sent using a request response communication scheme like http, where the card sends requests activation to the server and gets back the wanted in the response message. They can be also obtained by leveraging "subscribe and publish" communication schemes like SIP, whereby the UICC sends a first message to the server to request subscription activation and then gets later in time an asynchronous notification message from the server carrying the subscription parameters. All this information can be previously provided by the MNO to the activation server, following a subscription enrolment phase.

in step 5: updating the activation status from "Not Activated" to "Under Activation"; if step 4 is successfully executed;

in step 6, executing activation commands;

in step 7: sending an updated activation status "Activation process done" to the activation server;

in step 8: updating the activation status to "Activated", which is memorised in the activation applet.

Once the subscription activation process is completed, the activation server will send back to the UICC device a notification message.

At the end of this activation process, the UICC is configured for IMS services, and can provide for example the voice over IP and SMS basic services.

Thanks to the detection of the first insertion of the UICC in the handset, and more precisely thanks to the checking of the internal activation status, the activation process is launched immediately after the first insertion into a LTE-compatible device.

Figure 2:
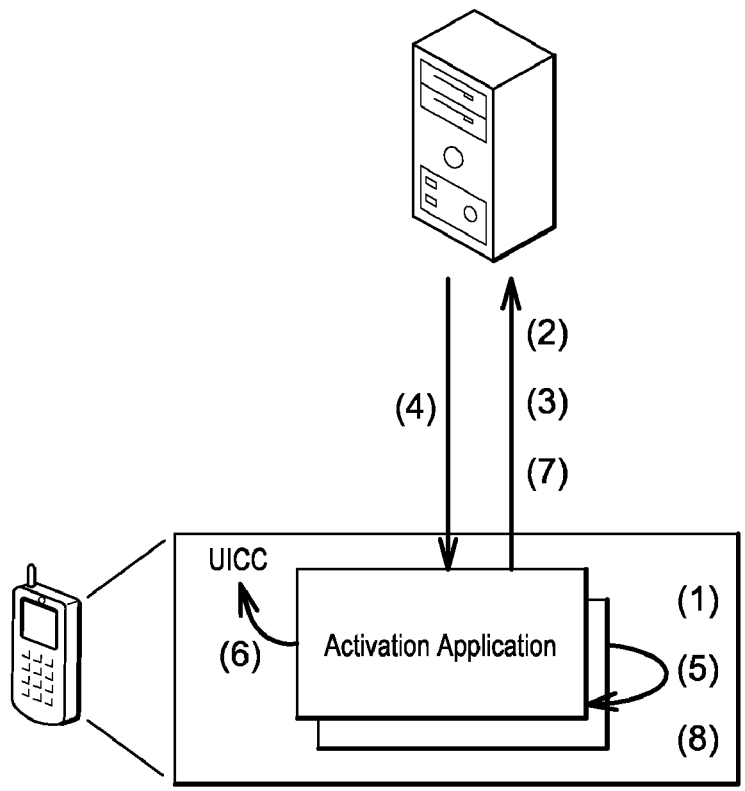
FIG. 2 schematically shows another embodiment of a method according to the invention.

In another embodiment as illustrated in FIG. 2, the activation applet process comprises a different step 7. After step 6, a step 7a consists in sending from the UICC to the activation server an updated status of the executing activation commands, then a step 7b consists in sending an updated activation "Activation process done" from the activation server to the UICC.

In another embodiment (not represented) of the method according to the invention, in step 4, the necessary subscription and technical information for the configuration of the IMS layer and its related services can be receiving back by the UICC device from the activation server through a new communication channel that can be opened thanks to the information provided in the "hello" message.

In another embodiment, the activation applet comprises a complementary retry mechanism. The activation applet comprises a retrying step 9, that consist in:

checking the activation status when it has to be updated for example after step 4 or step 8, and launching the activation process from step 2 if the activation status has not being update.

That may happen for example in case of connectivity problems. In this case the activation process is stopped, and the activation process is then not complete.

Thanks to the retrying step 9, a high quality of service is provided to the activation process. The activation applet tries and retries again until activation is performed. This embodiment is advantageously preferred as the activation process is launched as long as the subscription is not effective.

In doing so, each time the UICC is inserted in a handset, whatever the handset is the same or not, the activation applet will be able to know if the subscription is yet activated or not. By checking the activation status, if the activation status is "Activated", the activation applet will not retry to activate the subscription which is complete.

It will be understood that all these embodiments can be combined.

It will also be understood that the activation application may be a soft mask, a Multos application, or coded in the Operating System for example in a ROM memory or in a FLASH memory. The applet may be a java applet, or a .NET applet.

Such activation is performed OTA. There is no need to go in a PoS to activate the card.

Another advantage is that this OTA activation relies only on the IP packet-switched capability. There is no need to rely on the presence of an underlying SMS communication layer.

What is claimed is:

1. A method for activating the subscription of an UICC over-the-air, said UICC comprising an activation application, said method comprising:
   the step of activating the subscription of the holder of the UICC by sending a message to an activation server, said message being sent by the activation application to the activation server by using an IP based communication;
   the step of operating the UICC, to check an internal activation status;
   the step of operating the UICC to download parameters needed by the UICC from the activation server;
   the step of operating the UICC, according to instructions of an activation application, to execute activation commands in response to successful receipt of the parameters from the activation server and to change the activation status to "activated" upon successful execution of the activation commands; and
   the step operating the UICC to repeatedly retry activation until activation has occurred.

2. A method of claim 1, said method comprising the step of opening a IP based communication to a pre-defined server or an activation server, that belongs to the Mobile Network Operator (MNO) if the activation status is "Not Activated".

3. A method of claim 1, said download step comprises receiving back from the activation server, the necessary subscription and technical information for the subscription.

4. A method of claim 3, wherein the sending a message to an activation server is performed on a first communication channel, and wherein said download step comprises using a communication channel for the receiving of the necessary subscription and technical information for the subscription that is different from the first communication channel.

5. A method of claim 3, said method comprising the step of updating the activation status from "Not Activated" to "Under Activation" if the step of receiving back the necessary subscription and technical information for the subscription from the activation server is successfully executed.

6. A method of claim 1, comprising the step of receiving an over-the-air message from the activating server or updating files of said UICC.

7. A method of claim 1, wherein the IP based communication is provided by a long time evolution network.

8. A UICC device comprising a storage device containing instructions in the form of an activation application, said activation application containing instructions to cause the UICC device to process a method comprising:
   the step of activating the subscription of the holder of the UICC by sending a message to an activation server, said message being sent by the activation application to the activation server by using an IP based communication;
   the step of operating the UICC, to check an internal activation status;
   the step of operating the UICC to download parameters needed by the UICC from the activation server;
   the step of operating the UICC, according to instructions of an activation application, to execute activation commands in response to successful receipt of the parameters from the activation server and to change the activation status to "activated" upon successful execution of the activation commands; and
   the step operating the UICC to repeatedly retry activation until activation has occurred.

9. A handset comprising: a UICC having a storage device containing instructions in the form of an activation application, said activation application containing instructions to cause the UICC device to process a method including;
   the step of activating the subscription of the holder of the UICC by sending a message to an activation server, said message being sent by the activation application to the activation server by using an IP based communication;
   the step of operating the UICC, to check an internal activation status;
   the step of operating the UICC to download parameters needed by the UICC from the activation server;
   the step of operating the UICC, according to instructions of an activation application, to execute activation commands in response to successful receipt of the parameters from the activation server and to change the activation status to "activated" upon successful execution of the activation commands; and
   the step operating the UICC to repeatedly retry activation until activation has occurred.

10. The UICC device of claim 8, wherein the method comprises the step of opening a IP based communication to a pre-defined server or an activation server, that belongs to the Mobile Network Operator (MNO) if the activation status is "Not Activated".

11. The UICC device of claim 8, wherein the download step comprises receiving back from the activation server, the necessary subscription and technical information for the subscription.

12. The UICC device of claim 11, wherein the sending a message to an activation server is performed on a first communication channel, and wherein said download step comprises using a communication channel for the receiving of the necessary subscription and technical information for the subscription that is different from the first communication channel.

13. The UICC device of claim 11, wherein the method comprises the step of updating the activation status from "Not Activated" to "Under Activation" if the step of receiving back the necessary subscription and technical information for the subscription from the activation server is successfully executed.

14. The UICC device of claim 8, wherein the method comprises the step of receiving an over-the-air message from the activating server or updating files of said UICC.

15. The UICC device of claim 8, wherein the IP based communication is provided by a long time evolution network.

16. The handset of claim 9, wherein the method comprises the step of opening a IP based communication to a pre-defined server or an activation server, that belongs to the Mobile Network Operator (MNO) if the activation status is "Not Activated".

17. The handset of claim 9, wherein the download step comprises receiving back from the activation server, the necessary subscription and technical information for the subscription.

18. The handset of claim 17, wherein the sending a message to an activation server is performed on a first communication channel, and wherein said download step comprises of using a communication channel for the receiving of the necessary subscription and technical information for the subscription that is different from the first communication channel.

19. The handset of claim 17, wherein the method comprises the step of updating the activation status from "Not Activated" to "Under Activation" if the step of receiving back the necessary subscription and technical information for the subscription from the activation server is successfully executed.

20. The handset of claim 9, wherein the method comprises the step of receiving an over-the-air message from the activating server or updating files of said UICC.

21. The handset of claim 9, wherein the IP based communication is provided by a long time evolution network.

* * * * *